United States Patent Office 3,412,182
Patented Nov. 19, 1968

3,412,182
COMPLEX METAL SALTS OF PHOSPHATO ESTERS
Ken Fukuda, Shoichiro Hayashi, Takashi Owada, and Takashi Munekata, Nakoso-shi, Japan, assignors to Kureha Kagaku Kogyo Kabushiki Kaisha
No Drawing. Filed June 28, 1965, Ser. No. 467,682
Claims priority, application Japan, July 1, 1964, 39/38,119; June 5, 1965, 40/33,228, 40/33,229, 40/33,230
12 Claims. (Cl. 260—957)

ABSTRACT OF THE DISCLOSURE

Complex metal salts of organo-phosphorous compounds obtained by reacting a metallic salt of an organic-phosphoric acid of the formula

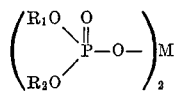

wherein $R_1$ is alkyl, substituted alkyl, aryl or substituted aryl and $R_2$ is a substituted alkyl or substituted aryl group containing 1 or more negative radicals, with an O,O-dialkyl-O-($\beta_1,\beta$-dichlorovinyl)phosphate compound of the formula

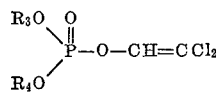

wherein $R_3$ and $R_4$ are alkyl groups of 1 to 4 carbon atoms. These compounds are useful as insecticides and acaricides.

---

This invention relates to new and useful organo-phosphorous compounds which are especially useful as active agents of insecticides and acaricides and the process for manufacturing the same. More specifically, it relates to such new chemical compounds having the general formula:

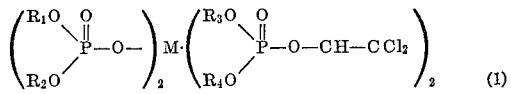   (1)

wherein $R_1$ is a member selected from the group comprising alkyl-, substituted alkyl-, having 1–4 carbon atoms, aryl- and substituted aryl group; $R_2$ is a member selected from the group comprising substituted alkyl- and substituted aryl group carrying one or more negative radicals such as halogen and nitro-group; $R_3$ and $R_4$ are members selected from alkyl groups having 1–4 carbon atoms which are either the same or different from each other; and M is a member selected from the group comprising divalent metal atoms belonging to second and fourth columns of the periodic table.

Main representative groups as represented by $R_1$ in the above meaning may be illustrated as follows, although these groups are not to be construed as limiting the invention: methyl-; ethyl-; n-propyl-; isopropyl-; n-butyl-; isobutyl-; vinyl-; alkyl-; chloroethyl-; bromoethyl-; $\alpha,\beta$-dichloroethyl-; chloropropyl-; $\beta,\gamma$-dichloropropyl-; chlorobutyl-; chloro-i-butyl-; chlorovinyl-; bromovinyl-; $\beta,\beta$-dichlorovinyl-; $\beta,\beta$-dibromovinyl-; $\beta,\gamma,\gamma$-trichloroalkyl-; phenyl-; p-chlorophenyl-; o-chlorophenyl-; 2,4-dichlorophenyl-; p-bromophenyl; p-fluorophenyl-; o-bromophenyl-; o-fluorophenyl-; 2,4-dibromophenyl-; p-nitrophenyl-; o-nitrophenyl-; 2,4-dinitrophenyl-; 2-chloro-4-nitrophenyl; etc.

Main representative groups as represented by $R_2$ in the above-meaning may be illustrated as follows, yet these groups are not to be construed as limiting the invention: $\beta$-chloroethyl-; $\alpha,\beta,\beta,\beta$-tetrachloroethyl-; $\beta$-chloro-$\alpha,\beta$-dibromoethyl-; $\beta,\beta$-dichloro-$\alpha,\beta$-dibromoethyl-; $\beta,\beta,\beta$-trichloroethyl-; $\beta$-chlorovinyl-; $\beta,\beta$-dichlorovinyl-; $\beta,\gamma$-dichloropropyl-; trichloropropyl-; tetrachloropropyl-; dichloroallyl-; $\beta,\gamma$-dichlorobutenyl-; $\alpha,\beta,\beta,\gamma$-tetrachlorobutenyl-; $\alpha,\beta$-dibromo-$\beta,\gamma$-dichlorobutenyl-; p-chlorophenyl-; o-chlorophenyl-; 2,4-dichlorophenyl-; 2,4,5-trichlorophenyl-; p-bromophenyl-; 2,4-dibromophenyl-; p-nitrophenyl-; 2,4-dinitrophenyl-; 2-chloro-4-nitrophenyl-; and so on.

$R_3$ and $R_4$ may be methyl-, ethyl-, isopropyl-, n-propyl-, n-butyl-, i-butyl group or the like.

Metal atoms as expressed by M in the above formula may be Ca, Ba, Mg, Sn or the like.

It is well known to those skilled in the art that O,O-dialkyl-O-($\beta,\beta$-dichlorovinyl) phosphates, especially O,O-dimethyl-O-($\beta,\beta$-dichlorovinyl) phosphate, provide a very quick effect in killing insects. However the use of these phosphates in the agricultural field has been considerably restricted, because these phosphates exert only a brief and limited effect; due to their higher volatility and relative instability in water resulting from quick hydrolysis.

The object of the present invention is to provide new compounds which have improved desirable properties such as persistency, stability in water, systemic action and low mammalian toxicity without losing the quick acting property.

In general, the compounds as obtained by the process of the present invention can be prepared by reacting a metallic salt of organo-phosphoric acid having a general formula:

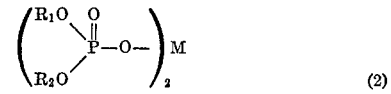   (2)

wherein $R_1$, $R_2$ and M are of the same meaning as was set forth hereinabove, with O,O-dialkyl-O-($\beta,\beta$-dichlorovinyl) phosphate having a general formula:

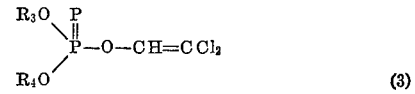   (3)

wherein $R_3$ and $R_4$ are of the same meaning as before. The reaction may be shown by the following equation:

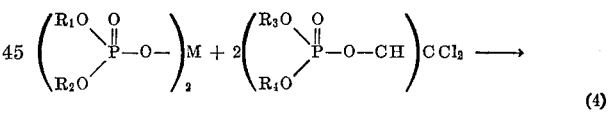   (4)

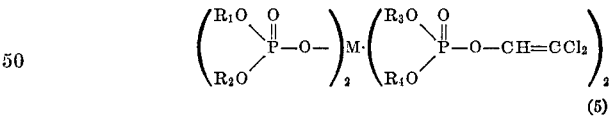   (5)

and can be carried into effect under a temperature between $-10°$ and $120°$ preferably in the presence of a suitable aqueous and/or inert solvent. The following solvents can be used in this reaction; water, methyl alcohol, ethyl alcohol, benzene, toluene, n-hexane, petroleum ether, ligroin, petroleum naphtha, chloroform, carbon tetrachloride, trichloroethylene, acetone, methyl ethyl ketone, ethyl acetate, ethyl ether, tetrahydrofurane etc.

Metallic salts of organo-phosphoric acid which can be used in the present invention may generally be prepared by reacting organo-phosphoric acids with metal hydroxides by the following equation:

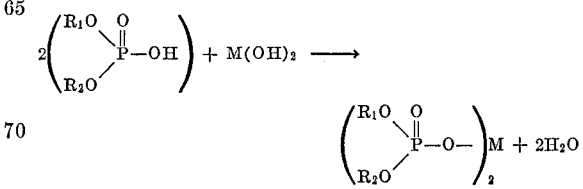

As the specific starting materials as expressed in the above equation by

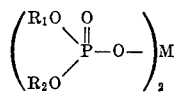

may be used those salts of:

bis-[O-methyl-O-($\beta,\beta$-dichlorovinyl) phosphoric acid];
bis-[O-ethyl-O-($\beta,\beta$-dichlorovinyl) phosphoric acid];
bis - [O - iso - propyl-O-($\beta,\beta$-dichlorovinyl) phosphoric acid];
bis-[O-n-butyl-O-($\beta,\beta$-dichlorovinyl) phosporic acid];
bis-[O-($\beta$-chloroethyl)-O($\beta,\beta$-dichlorovinyl) phosphoric acid];
bis-[O-phenyl-O-($\beta,\beta$-dichlorovinyl) phosphoric acid];
bis-[O-(p-chlorophenyl)-O - ($\beta,\beta$ - dichlorovinyl) phosphoric acid];
bis-[O (p-nitrophenyl)-O-($\beta,\beta$-dichlorovinyl) phosphoric acid];
bis-[O-methyl-O-($\alpha$-chloro - $\beta,\beta,\beta$ - trichloroethyl phosphoric acid];
bis-[O-ethyl-O-($\alpha$-chloro $\beta,\beta,\beta$-trichloroethyl) phosphoric acid];
bis-[O-iso-propyl-O-($\alpha$-chloro-$\beta,\beta,\beta$-trichloroethyl) phosphoric acid];
bis-[O-phenyl-O-($\alpha$-chloro-$\beta,\beta,\beta$-trichloroethyl) phosphoric acid];
bis-[O-methyl-O-($\beta$-chlorovinyl) phosphoric acid];
bis-[O-n-butyl-O-($\beta$-chlorovinyl) phosphoric acid];
bis-[O-methyl-O-($\beta$-chloroethyl) phosphoric acid];
bis-[O-iso-propyl-O-($\beta$-chloroethyl) phosphoric acid];
bis-[O-methyl-O-(p-nitrophenyl) phosphoric acid];
bis-[O,O-di-(p-chlorophenyl) phosphoric acid];

As the second starting material expressed in the foregoing equation by

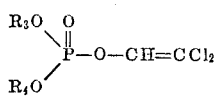

the following compounds may be used by way of example:

O,O-dimethyl-O-($\beta,\beta$-dichlorovinyl) phosphate;
O,O-diethyl-O-($\beta,\beta$-dichlorovinyl) phosphate;
O,O-di-isopropyl-O-($\beta,\beta$-dichlorovinyl) phosphate;
O-methyl-O-iso-propyl-O-($\beta,\beta$ - dichlorovinyl) phosphate;
O,O-di-n-butyl-O-($\beta,\beta$-dichlorovinyl) phosphate;

As the new and useful products of the present inventive process expressed in the foregoing by:

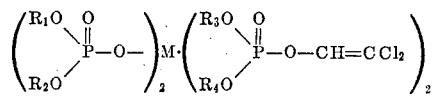

the following compounds are hereinafter set forth by way of example:

Complex calcium salt of bis-[O-methyl-O-($\beta,\beta$-dichlorovinyl) phosphoric acid] with O,O-dimethyl-O-($\beta,\beta$-dichlorovinyl) phosphate;
Complex magnesium salt of bis-[O-methyl-O-($\beta,\beta$-dichlorovinyl) phosphoric acid] with O,O-dimethyl-O-($\beta,\beta$-dichlorovinyl) phosphate;
Complex calcium salt of bis-[O-methyl-O-($\beta,\beta$-dichlorovinyl) phosphoric acid] with O,O-diethyl-O-($\beta,\beta$-dichlorovinyl) phosphate;
Complex calcium salt of bis-[O-ethyl-O-($\beta,\beta$-dicholorovinyl) phosphoric acid] with O-methyl-O-iso-propyl-O-($\beta,\beta$-dichlorovinyl phosphate;
Complex calcium salt of bis-[O-phenethyl-O-($\beta,\beta$-dichlorovinyl) phosphoric acid] with O,O-dimethyl-O-($\beta,\beta$-dichlorovinyl) phosphate;
Complex calcium salt of bis-[O-(p-chlorophenyl)-O- ($\beta$,$\beta$-dichlorovinyl) phosphoric acid] with O,O,-dimethyl-O-($\beta,\beta$-dichlorovinyl) phosphate;
Complex barium salt of bis-[O-(p-chlorophenyl)-O-($\beta$,$\beta$-dichlorovinyl) phosphoric acid] with O,O-di-n-butyl-O-($\beta,\beta$-dichlorovinyl) phosphate;
Complex calcium salt of bis-[O-(p-nitrophenyl)-O-($\beta,\beta$-dichlorovinyl) phosphoric acid] with O,O-diethyl-O-$\beta,\beta$-dichlorovinyl) phosphate;
Complex magnesium salt of bis[O-(p-nitrophenyl)-O-($\beta,\beta$-dichlorovinyl) phosphoric acid] with O,O-diethyl-O-($\beta,\beta$-dichlorovinyl) phosphate;
Complex calcium salt of bis-[O-methyl-O-($\alpha$-chloro-$\beta,\beta,\beta$ - trichloroethyl) phosphoric acid] with O,O-dimethyl-O-($\beta,\beta$-dichlorovinyl) phosphate;
Complex calcium salt of bis-[O-methyl-O-($\alpha$-chloro-$\beta,\beta,\beta$-trichloroethyl) phosphoric acid] with O,O-diethyl-O-($\beta,\beta$-dichlorovinyl) phosphate;
Complex tin salt of bis-[O-methyl-O-($\alpha$-chloro-$\beta,\beta,\beta$-trichloroethyl) phosphoric acid] with O-methyl-O-iso-propyl-O-($\beta,\beta$-dichlorovinyl) phosphate;
Complex calcium salt of bis-[O-methyl-O-($\beta$-chloroethyl) phosphoric acid] with O,O-diemthyl-O-($\beta,\beta$-dichlorovinyl) phosphate;
Complex calcium salt of bis-[O-n-butyl-O-($\beta$-chlorovinyl)phosphoric acid] with O,O-diethyl-O-($\beta,\beta$-dichlorovinyl)phosphate;
Complex calcium salt of bis-[O-methyl-O-(p-nitrophenyl) phosphoric acid] with O,O-diethyl-O-($\beta,\beta$-dichlorovinyl)phosphate;
Complex calcium salt of bis-[O-di-(p-chlorophenyl) phosphoric acid] with O,O-dimethyl-O-($\beta,\beta$-dichlorovinyl)phosphate.

The first reaction component of the inventive process, that is, metallic salts of organo-phosphoric acid can also be prepared from organo-phosphates reacted with metal halides as shown in the following equation:

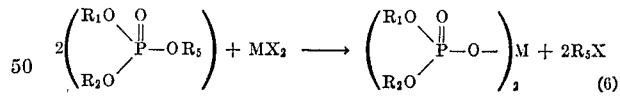

wherein $R_1$, $R_2$ and M are the same as set forth hereinbefore; $R_5$ is a member selected from lower alkyl groups having 1–4 carbon atoms, and X is a halogen atom. The present reaction can be easily carried into effect under the same conditions as set forth hereinbefore in connection with Equation 4.

When $R_3$ and $R_4$ represent the same groups as $R_1$ and $R_2$, respectively, and $R_2$ is a $\beta,\beta$-dichlorovinyl radical, the both reactions expressed by the Equations 6 and 4 can be carried into effect continuously, without any need for separating the resulted metallic salt of organophospheric acid, as in the following Equation 7:

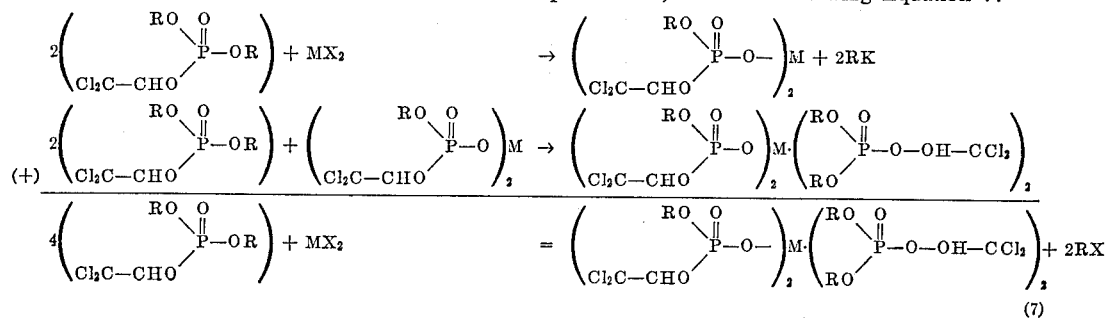

(7)

wherein R is a member selected from lower alkyl groups having 1–4 carbon atoms; M is divalent metal atom as indicated above; and X is a halogen atom.

Several new and useful compounds of the present invention can be produced by reacting that trialkyl phosphate with a metal halide and chloral at a temperature between —10° and 120° C., preferably in the presence of an inert solvent such as ethyl ether, benzene, n-hexane, carbon tetrachloride or the like, and without separating the intermediate metallic salt of organo-phosphoric acid thereby formed.

These new organo-phosphorus compounds as obtained by the present inventive process have a quick action in killing insects and mites with better persistency, effective systemic action and lower mammalian toxicity, and are therefore highly useful in the control of insects and mites in the household and agricultural field.

For applying the complex compounds of the present invention to the control of insects and mites, usual procedures familiar to those skilled in the art may be optionally employed. More specifically, the agents alone or admixed with suitable carriers or added if necessary with other adjuvants to form emulsifiable concentrates, wettable powders, water soluble powders, oil solutions, dusts and aerosols may be applied. The carriers are the materials in which the active ingredients of the present invention are applied to the insects and mites and the carriers may be in the form of a solid, liquid or gas. For solids, for example, clays, talc, kaolinites, silica sand and activated charcoal may be used. For liquids, for example, the solvents for the complex compounds of the present invention, such as water, benzene, acetone, ethanol and methanol, non-solvents in effect such as kerosene, animal and vegetable oils also may be employed so as to emulsify or suspend the active ingredients of the present invention with the aid of an adjuvant. Suitable gases include, for example air, nitrogen, carbon dioxide, vinylchloride or Teflon may be used. Other adjuvant herein means various materials other than carriers which aid the use of the active ingredients of the present invention in their application to the pesticides. For instance emulsifiers, adherents, stickers and wetting agents may be added if necessary.

Moreover the active ingredients of the present invention may be admixed with any selected agricultural chemical or chemicals such as fertilizers, other insecticides, acaricides, fungicides and herbicides unless the aforesaid materials are strongly alkaline.

In order that the present invention may be more fully understood several examples will be given hereinafter. These examples are not to be construed as limiting the invention.

Example 1

73.5 g. of $CaCl_2 \cdot 2H_2O$ were dissolved in 200 ml. of a 50% aqueous methyl alcohol solution, and 221 g. of O,O-dimethyl - O - ($\beta,\beta$-dichlorovinyl) phosphate were added dropwise to the solution accompanied by vigorous stirring at 70°–75° C. The reaction mixture was then stirred for twelve hours at the same temperature. During the reaction 98% of the theoretical amount of methyl chloride was collected in a cold trap. After the reaction the mixture was cooled to room temperature and the white crystals thus obtained were separated by filtration. The crystals were recrystallized from water and obtained as white needles with 79.3% yield of theoretical amount, having an M.P. of 140°–158° C. C, H, Cl, Ca and infrared spectrum analysis show the existence of bis-[O-methyl-O-($\beta,\beta$-dichlorovinyl) phosphoric acid] calcium salt, and Karl Fischer's analysis showed that the product has two moles of water of crystallization. There was no free ionized chlorine detected by the usual analytical method.

48.8 g. of the calcium salt of bis-[O-methyl-O-($\beta,\beta$-dichlorovinyl)acid] having two moles water of crystallization which is obtained by the above reaction was suspended in 250 ml. of n-hexane, and 44.2 g. of O,O-dimethyl-O-($\beta,\beta$-dichlorovinyl) phosphate were added and refluxed accompanied by vigorous stirring. The water included in the calcium salt of bis-[O-methyl-O-($\beta,\beta$-dichlorovinyl) phosphoric acid] was removed azeotropically during the reaction. After four hours reaction n-hexene was distilled off under reduced pressure and the colorless highly viscous liquid thus obtained was then transferred into a dish. After eight hours with occasional stirring at room temperature, a white solid material was obtained. This material was then dissolved in ethyl ether, and a colorless viscous oil was obtained as a precipitate by addition of n-hexane to this ether solution. The same treatment was repeated twice and the colorless viscous oil obtained was then placed in a flask. The oily material was treated under vacuo (1 mm. Hg) at 65° C., but there was no volatile material. After allowing this material to stand for five hours in a dish accompanied by occasional stirring, white crystals were obtained with 94% yield of theoretical amount, having an M.P. 65°–67° C. By the analysis of C, H, Ca, Cl and infrared spectrum, these crystals were identified as a complex calcium salt of bis-[O-methyl-O-($\beta,\beta$-dichlorovinyl) phosphoric acid] with O,O-dimethyl - O - ($\beta,\beta$-dichlorovinyl) phosphate. This compound is soluble in acetone, methyl alcohol, ethyl alcohol, carbon tetrachloride, benzene, toluene, ethyl ether or water.

Example 2

88.4 g. of O,O-dimethyl-O-($\beta,\beta$-dichlorovinyl) phosphate were cooled to —10° C. and 11.1 g. of anhydrous calcium chloride in its powdered form were added slowly in small portions over a 30-minute period accompanied by vigorous stirring. The temperature was held below —8° C. throughout the addition even though the reaction was exothermic. Upon completing the reaction the reaction mixture was allowed to warm to room temperature. After eight hours stirring, the reaction mixture was filtered to remove a small amount of unreacted calcium chloride. The filtrate, a colorless viscous liquid was then dissolved in benzene. A colorless viscous oil was precipitated by addition of n-hexane, and the oil thus precipitated was separated by means of a separating funnel. The same treatment just described above was reacted twice more, and the colorless viscous oil thus obtained was placed in a dish. After six hours of allowing to stand in a refrigerator with occasional stirring, white crystals were obtained with 97% yield of theoretical amount, having an M.P. 63°–67° C. These crystals, on analysis, did not contain any free ionized chlorine. The infrared spectrum was identical with the complex calcium salt of bis-[O-methyl - O - ($\beta,\beta$-dichlorovinyl) phosphoric acid] with O,O-dimethyl - O - ($\beta,\beta$-dichlorovinyl) phosphate which was obtained in Example 1. A mixture thereof with the compound obtained in Example 1 did not show a lower melting point value.

A similar reaction was carried out with use of methyl alcohol, ethyl alcohol, n-hexane, petroleum ether, ligroin, petroleum naphtha, chloroform, carbon tetrachloride, trichloro ethylene, benzene, toluene, xylene, ethyl ether, tetrahydroforane, ethyl acetate and water, respectively, and the same results were obtained.

Example 3

49.6 g. of trimethylphosphite and 11.1 g. of anhydrous calcium chloride powder were placed together in a reaction flask with 250 ml. of anhydrous benzene, and cooled to 0° C. while stirring. 59 g. of chloral were added dropwise to the mixture over a 45-minute period. The temperature was held between 0° and 2° C. throughout the addition even though the reaction was exothermic. When the reaction was completed the reaction mixture was allowed to rise to room temperature. After stirring the mixture at room temperature for eight hours, the desired product was separated by removing benzene under vacuo, thereby yielding a colorless viscous liquid. The same purification as described in Example 1 was applied to the product with ethyl ether and n-hexane. The product thus obtained as a colorless viscous oil was then placed in a dish, and was allowed to stand at room temperature with occasional stirring. The product in the form of white crystals showed M.P. 63°–67° C. and 85% yield based upon trimethylphosphite. A mixture thereof with the product in Example 1 showed no lowered melting point.

Example 4

59.4 g. of calcium salt of bis-[O-methyl-O-($\alpha$-chloro-$\beta,\beta,\beta$-trichloroethyl) phosphoric acid], which was obtained by the reaction of O,O-dimethyl-O-($\alpha,\beta,\beta,\beta$-tetrachloroethyl) phosphate and calcium chloride, and 44.2 g. of O,O-dimethyl-O-($\beta,\beta$-dichlorovinyl) phosphate were refluxed in 100 ml. of ethyl alcohol for three hours. After the reaction was completed, ethyl alcohol was removed at the atmospheric pressure and then under vacuo, and thus the desired product was obtained as a colorless high viscous oil. The product was dissolved in ethyl ether and n-hexane was then added to precipitate the product. The same treatment was repeated twice more. The product was obtained as a colorless high viscous oil and was treated under vacuo at 60° C. to remove a small amount of residual solvent. The product could not be distilled, and was thus impossible to measure its $n_D$. By the analysis of infrared spectrum, C, H, Ca and Cl, the product was identified as a complex calcium salt of bis-[O-methyl-O-($\alpha,\beta,\beta,\beta$-tetrachloro ethyl) phosphoric acid] with O,O-dimethyl-O-($\beta,\beta$-dichlorovinyl) phosphate.

Example 5

57.4 g. of calcium salt of bis- [O-phenyl-O-($\beta,\beta$-dichlorovinyl) phosphoric acid], which was obtained by the reaction of O-methyl-O-phenyl-O-$\beta,\beta$-dichlorovinyl) phosphate with calcium chloride, and 44.2 g. of O,O-dimethyl-O-($\beta,\beta$-dichlorovinyl) phosphate were refluxed in 200 ml. of tetrahydrofurane for four hours. After removing tetrahydrofurane from the reaction mixture, slightly brown colored solids were precipitated by addition of n-hexane. The oil thus separated was treated with ethyl ether and n-hexane twice more. After the oil was heated under vacuo at 65° C. to remove the solvent, the oil was allowed to stand at room temperature. The solids thus obtained showed an M.P. of 65° C. and 85% yield of theoretical amount. In this way, a complex calcium salt of bis-[O-phenyl-O-($\beta,\beta$-dichlorovinyl) phosphoric acid] with O,O-dimethyl-O-($\beta,\beta$-dichlorovinyl) phosphate was obtained.

Example 6

64.5 g. of calcium salt of bis-[O-(p-chlorophenyl)-O-($\beta,\beta$-dichlorovinyl) phosphoric acid], which was obtained by the reaction of O-ethyl-O-(p-chlorophenyl)-O-($\beta,\beta$-dichlorovinyl) phosphate with calcium chloride, and 44.2 g. of O,O-dimethyl-O-($\beta,\beta$-dichlorovinyl) phosphate were reflexed in 200 ml. of carbon tetrachloride for six hours. The product which was obtained from the reaction mixture by removing carbon tetrachloride was dissolved in ethyl ether and precipitated by addition of n-hexane. The oil thus separated is then treated with ethyl ether and n-hexane as described above twice more. The thus obtained product was then treated under vacuo (0.5 mm. Hg) at 60° C. to remove the solvent completely. The yield amounted to 91% of the theoretical amount. This compound could not be distilled even under vacuo (0.05 mm. Hg). In this way, a complex calcium salt of bis-O-(p-chlorophenyl)-O-($\beta,\beta$-dichlorovinyl) phosphoric acid with O,O-dimethyl-O-($\beta,\beta$-dichlorovinyl) phosphate was obtained.

Example 7

65 g. of magnesium salt of bis-[O-(p-nitrophenyl)-O-($\beta,\beta$-dichlorovinyl) phosphoric acid], which was obtained by the reaction of O-methyl-O-(p-nitrophenyl)-($\beta,\beta$-dichlorovinyl) phosphate with anhydrous magnesium chloride, and 44.2 g. of O,O-diethyl-O-($\beta,\beta$-dichlorovinyl) phosphate were refluxed in 200 ml. ethyl alcohol for twelve hours. After removing the solvent, the residual oil was dissolved in ethyl ether and precipitated by addition of n-hexane. This purification method was then repeated twice more. The product thus obtained as a slightly yellow colored high viscous oil was allowed to stand at room temperature and then at 0° C., yet did not solidify. In this way, a complex magnesium salt of bis-[O-(p-nitrophenyl)-O-($\beta,\beta$-dichlorovinyl) phosphoric acid] with O,O-diethyl-O-($\beta,\beta$-dichlorovinyl) phosphate was obtained.

Example 8

A number of compounds as obtained by the inventive process and identified in Table 1 hereinbelow, were tested for insecticidal activity upon house flies. In these tests the compounds were employed at a concentration of 0.5% in acetone, and 0.4$\gamma$ and 0.2$\gamma$ of the active ingredient respectively per one female house fly were applied on the back of each fly. Each result was taken by twenty-five female flies in one dish with three repetitions.

TABLE 1

| Compounds | Percent mortality | |
| --- | --- | --- |
| | 0.4 | 0.2 |
| Complex calcium salt of bis-[O-methyl-O-($\beta,\beta$-dichlorovinyl) phosphoric acid] with O,O-dimethyl-O-($\beta,\beta$-dichlorovinyl) phosphate | 100 | 100 |
| Complex magnesium salt of bis-[O-methyl-O-($\beta,\beta$-dichlorovinyl) phosphoric acid] with O,O-dimethyl-O-($\beta,\beta$-dichlorovinyl) phosphate | 76 | 40 |
| Complex calcium salt of bis-[O-methyl-O-($\alpha$-chloro-$\beta,\beta,\beta$-trichloroethyl) phosphoric acid] with O,O-dimethyl-O-($\beta,\beta$-dichlorovinyl) phosphate | 100 | 100 |
| Complex calcium salt of bis-[O-methyl-O-($\alpha$-chloro-$\beta,\beta,\beta$-trichloroethyl) phosphoric acid] with O,O-diethyl-O-($\beta,\beta$-dichlorovinyl) phosphate | 100 | 84 |
| Complex calcium salt of bis-[O-phenyl-O-($\beta,\beta$-dichlorovinyl) phosphoric acid] with O,O-dimethyl-O-($\beta,\beta$-dichlorovinyl) phosphate | 100 | 64 |
| Complex calcium salt of bis-[O-(p-chlorophenyl)-O-($\beta,\beta$-dichlorovinyl) phosphoric acid] with O,O-dimethyl-O-($\beta,\beta$-dichlorovinyl) phosphate | 100 | 73 |
| Cf. O,O-dimethyl-O-($\beta,\beta$-dichlorovinyl) phosphate | 100 | 100 |

Example 9

100 mg./m² of active ingredients as obtained by the present invention were sprayed on glass plates. After three hours and fifteen days respectively, twenty-five female house flies were placed on the glass surface. The house flies were examined after each 10, 30, 60 and 120 minutes, and the percent mortalities of the flies were recorded. The results of this persistency test employing various compounds are enumerated in Table 2 hereinbelow:

TABLE 2

| Compounds | Percent mortality, minutes | | | |
| --- | --- | --- | --- | --- |
| | 10 | 30 | 60 | 120 |
| Complex calcium salt of bis-[O-methyl-O-($\beta,\beta$-dichlorovinyl) phosphoric acid] with O,O-dimethy)-O-($\beta,\beta$-dichlorovinyl) phosphate: | | | | |
| 3 hrs. | 100 | | | |
| 15 days | 87 | 100 | | |
| Complex calcium salt of bis-[O-methyl-O-($\alpha,\beta,\beta,\beta$-tetrachloroethyl) phosphoric acid] with O,O-dimethyl-O-($\beta,\beta$-dichlorovinyl) phosphate: | | | | |
| 3 hrs. | 100 | | | |
| 15 days | 0 | 44 | 100 | |
| Cf. O,O-dimethyl-O-($\beta,\beta$-dichlorovinyl) phosphate: | | | | |
| 3 hrs. | 24 | 100 | | |
| 15 days | 0 | 0 | 0 | 0 |

Example 10.—Quick-acting test 2 ml. of 0.5% acetone solution of active ingredient were sprayed into a cylindrical glass container from above. After 10 seconds 25 female house fly adults were released into the glass container. The mortalities were counted every minute after release and the FT-100 (which means the time required to bring about 100% killing) was observed. Test results are shown in Table 3 hereinbelow:

TABLE 3

| Time after release (minutes): | Product obtained in Example 1 | DDVP | Dipterex |
|---|---|---|---|
| 1 | 0 | 6 | 0 |
| 2 | 80 | 100 | 64 |
| 3 | 100 | | 88 |
| 4 | | | 100 |
| KT-100 | (1) | (2) | (3) |

[1] 2 min. 40 sec.
[2] 2 min.
[3] 3 min. 12 sec.

Example 11.—Activities on aphid and tetranychus 50 and 100 times diluted aqua-solutions of the formulation as set forth in Example 19 and Example 20 respectively, were sprayed on crop leants with parasites. The mortality of parasites were observed 24 hrs. after the application. The test results are shown in Table 4 hereinbelow:

TABLE 4

| | Aphid sp. on broad bean plant | | Tetranychus sp. on French bean plant |
|---|---|---|---|
| | Mortality | | |
| | 50 times soln. | 100 times soln. | 50 times soln. |
| Complex calcium salt of bis-[O-methyl-O-($\beta,\beta$-dichlorovinyl) phosphoric acid] with O,O-dimethyl-O-($\beta,\beta$-dichlorovinyl) phosphate | ++ | + | ++ |
| Complex magnesium salt of bis-methyl-O-($\beta,\beta$-dichlorovinyl) phosphoric acid] with O,O-dimethyl-O-($\beta,\beta$-dichlorovinyl) phosphate | ++ | + | + |
| Complex calcium salt of bis-[O-methyl-O-($\alpha,\beta,\beta,\beta$-tetrachloroethyl) phosphoric acid] with O,O-dimethyl-O-($\beta,\beta$-dichlorovinyl) phosphate | ++ | + | + |
| Cf. O,O-dimethyl-O-($\beta,\beta$-dichlorovinyl) phosphate (DDVP) | ++ | ++ | ++ |
| No treatment | − | − | − |

Wherein: ++ means 100% mortality; + means less than 100% mortality; − means no mortality.

Example 12.—Activity on house fly larvae

The compound in the present invention, which was formulated as 5% emulsifiable concentrate set forth in the Example 19, was tested on house fly larvae in comparison with O,O-dimethyl-O-($\beta,\beta$-dichlorovinyl) phosphate ("DDVP") and O,O-dimethyl-O-($\alpha$-hydroxy-$\beta,\beta,\beta$-trichloroethyl) phosphonate ("Dipterex") which were also formulated as 5% emulsifiable concentrates respectively.

Each of the emulsifiable concentrates was diluted with water to make 100, 50, 25, 12.5 and 6.25 p.p.m. solution. Twenty larvae of house fly were dipped in a 20 ml. solution of these concentrates in a 100 ml. bottle for one hour period. Then the active solutions were removed and the bottles were washed three times with each 20 ml. of water. The treated larvae were transferred into 50 ml. bottles which contained sand with food. The percent mortality was recorded until the larvas grow up to adults. The results are shown in Table 5 hereinbelow:

TABLE 5

| | Percent mortality of Larvae | | | | |
|---|---|---|---|---|---|
| P.p.m. | 100 | 50 | 25 | 12.5 | 6.25 |
| Product of Example, and as formulated in Example 19 | 60 | 40 | 20 | 10 | 5 |
| DDVP | 75 | 50 | 30 | 15 | 5 |
| Dipterex | 40 | 20 | 10 | 5 | 0 |
| No treatment | 0 | 0 | 0 | 0 | 0 |

Example 13.—Activity on *Sitophilus oryzae* Linne (rice weevil)

0.5 part of the compound obtained in Example 1 hereinbefore was mixed with 99.5 parts of p-dichlorobenzene and the mixture was tabletted weighing 2.31 g. The biological activity of this was compared with a 2.31 g. tablet of p-dichlorobenzene on *Sitophilus oryzae* Linne. In a glass tube (14 on $\phi$ x 43 cm.) were placed four metallic cages fixed to a stand at distances of 10, 20, 30 and 40 cm. from the bottom of the glass tube. Each metallic cage contained 6.5 g. rice and twenty-five *Stitophilus orzae* Linne. The aforesaid tablets were placed on the bottom of the glass tube and the percent mortality was recorded fifteen hours later. The results are shown in Table 6 hereinbelow:

TABLE 6

| | Percent mortality after 15 hours | | | |
|---|---|---|---|---|
| Centimeters | 10 | 20 | 30 | 40 |
| Tablet containing 0.5% of the product of Example 1 | 100 | 100 | 100 | 60 |
| Tablet containing p-dichlorobenzene | 0 | 0 | 0 | 0 |

Example 14.—Activity as systemic insecticide 0.1 and 0.05% aqueous solutions of the compound obtained by the present invention as set forth in Example 1 were tested on rice plant as systemic insecticide respectively. The same concentrations of Dipterex were also used. After twenty-four hours dipping of four leaves of an aged rice plant (about 15 cm. high) in 10 ml. of the active aqueous solution prepared above, twenty *Macrosiphum granarium* Kirbys were put on the rice plant. The percent mortality after twenty-four hours are set forth in Table 7 below.

TABLE 7

| | Percent Mortality [1] | |
|---|---|---|
| | 0.1% soln. | 0.05% soln. |
| Product in the present invention of Example 1 | 100 | 100 |
| Dipterex | 100 | 83 |
| No treatment | 0 | 0 |

[1] These data are the average of five repetitions.

Example 15.—Oral toxicity on *Macrosiphum granarium* Kirby

Twenty aphides (*Macrosiphum granarium* Kirby) were placed on a "Kurehalon" film which is air and/or gas impermeable and obtained by copolymerization of vinylchloride with vinylidene chloride, and covered with glass. Underneath the film was placed 0.65 ml. of 5% aqueous solution containing various concentration of the product obtained by the present invention as set forth in Example 1, and the solution was held on a paper coated with paraffin. The aphid sucked up the solution through the film, so that there was no vapour effect. The percent mortality was observed after twenty-four hours, and is shown hereinbelow in Table 8.

TABLE 8

| | Percent mortality | | | |
|---|---|---|---|---|
| P.p.m. | 25 | 12.5 | 6.25 | 3.125 |
| Product of Example 1 | 100 | 100 | 80 | 50 |
| Dipterex | 25 | 10 | 0 | 0 |
| No treatment | 0 | 0 | 0 | 0 |

Example 16.—Contact toxicity on *Macrosiphum granarium* Kirby

The product obtained in Example 1 was dissolved in water in various concentration and sprayed on a filter paper, followed by placing thereon twenty-five aphides *Macrosiphum granarium* Kirby. After twenty-four hours the percent mortality was recorded. Dipterex and DDVP were used in the test. The results are shown in Table 9.

TABLE 9

| Mg./m.$^2$ | Percent mortality | | | | |
|---|---|---|---|---|---|
| | 0.05 | 0.01 | 0.005 | 0.001 | 0.0005 |
| Product of Example 1 | 100 | 100 | 100 | 86 | 20 |
| DDVP | 100 | 100 | 100 | 88 | 50 |
| Dipterex | 100 | 92 | 56 | 4 | 0 |
| No treatment | 0 | 0 | 0 | 0 | 0 |

Example 17

Stability of the product obtained in Example 1 and in the form of an aqueous solution was measured in the presence as well as absence of sun light compared with DDVP. Both of the compounds were placed in a 0.1% aqueous solution sealed in glass tubes, and allowed to stand in a green house and in a dark room, respectively. After standing various days each sample was sprayed on a filter paper (100 mg./m.$^2$ as active ingredient); twenty-five female house flies were placed on the filter paper, and the percent mortality was recorded after twenty-four hours. The results are shown in Table 10.

TABLE 10

| Days | Under sun light | | In the dark room | |
|---|---|---|---|---|
| | Product of Example 1 | DDVP | Product of Example 1 | DDVP |
| 1 | 100 | 60 | 100 | 90 |
| 4 | 70 | 39 | 100 | 80 |
| 7 | 50 | 36 | 80 | 60 |
| 11 | 44 | 29 | 70 | 50 |
| 15 | 32 | 18 | 57 | 45 |
| 18 | 26 | 14 | 50 | 36 |
| 22 | 18 | 10 | 46 | 33 |
| 30 | 8 | 2 | 35 | 28 |

Note.—Temperature: 17°–53° C., Humidity: 15–25% as under sun light; Temperature: 17°–20° C., Humidity: 80% as in the dark room.

0.1% aqueous solutions of the product obtained in Example 1 and DDVP were prepared respectively. 0.05 ml. of the solution were spread on a glass plate using microsyringe, in the presence as well as absence of sun light in two ways. After standing several days the glass plate was then washed with acetone in a petri-dish, and dried up. Twenty-five aphides (*Macrosiphum granarium* Kirby) were put on the dish, and the percent mortality was examined after twenty-four hours. The results are shown in the following Table 11.

TABLE 11

| Days | Under sun light | | In dark room | |
|---|---|---|---|---|
| | Product of Example 1 | DDVP | Product of Example 1 | DDVP |
| 0 | 100 | 100 | 100 | 100 |
| 1 | 100 | 0 | 100 | 0 |
| 2 | 100 | | 100 | |
| 3 | 100 | | 100 | |
| 4 | 100 | | 100 | |
| 5 | 100 | | 100 | |
| 15 | 68 | | 100 | |

These data are the average of three repetitions.

Example 18.—Toxicity for mammal

Mice were examined for acute oral toxicity using conventional procedures. The data obtained are shown in the following Table 12.

TABLE 12

| | Acute oral toxicity (mice), LD$_{50}$ mg./kg. |
|---|---|
| Complex calcium salt of bis-[O-methyl-O-($\beta,\beta$-dichlorovinyl) phosphoric acid] with O,O-dimethyl-O-($\beta,\beta$-dichlorovinyl) phosphate | 380 |
| Complex calcium salt of bis-[O-methyl-O-($\alpha,\beta,\beta,\beta$-tetrachloroethyl) phosphoric acid] with O,O-dimethyl-O-($\beta,\beta$-dichlorovinyl) phosphate | 440 |

Example 19

To prepare an emulsifiable concentrate, 5 parts of the complex product obtained in Example 1, 88 parts of xylene and 7 parts of emulsifier "XJ–918" manufactured and sold by a Japanese firm, Lion Oil Company, Limited, Tokyo, are mixed together. This concentrate may be diluted with water to any desired concentration and may be applied by conventional spraying techniques.

Example 20

To prepare water soluble powder. 0.5 part of the complex product obtained in Example 1; 0.01 part of sticker ("Solpol W–150") and 99.4 parts of water are mixed together and the mixture may be applied by spraying.

Example 21

15 parts of the complex product obtained in Example 1; 80 parts of kieselguhr and 5 parts of wetting agent ("Flurovic FO68") are mixed in a ball mill, followed by passing the mixture through a screen. This powder being a wettable powder, may be diluted with water before it is used.

Example 22

0.5 part of the product obtained in Example 7 is dissolved in 4.5 parts of acetone, and 95 parts of white kerosene are added to the solution. This homogeneous mixture may be sprayed in the form of an oil solution.

Example 23

1 part of the product obtained in Example 5 is premixed with 10 parts of talc, and the premixture is mixed with 89 parts of remainder talc in a mixing pulverizer. The mixture after screening may be used as an insecticide and acaricide powder.

Example 24

0.5 part of the product obtained in Example 4; 50 parts of xylene and 49.5 parts of "Freon-11" are filled in a pressure vessel for aerosol. This mixture may be used as an aerosol.

We claim:

1. Complex calcium salt of bis-[O-methyl-O-($\beta,\beta$-dichlorovinyl) phosphoric acid] with O,O-dimethyl-O-O-($\beta,\beta$-dichlorovinyl) phosphate.

2. Complex magnesium salt of bis-[O-methyl-O-($\beta,\beta$-dichlorovinyl) phosphoric acid] with O,O-dimethyl-O-($\beta,\beta$-dichlorovinyl) phosphate.

3. Complex calcium salt of bis-[O-methyl-O-($\beta,\beta$-dichlorovinyl) phosphoric acid] with O,O-diethyl-O-($\beta,\beta$-dichlorovinyl) phosphate.

4. Complex calcium salt of bis-[O-ethyl-O-($\beta,\beta$-dichlorovinyl) phosphoric acid] with O-methyl-O-iso-propyl-O-($\beta,\beta$-dichlorovinyl) phosphate.

5. Complex calcium salt of bis-[O-phenyl-O-($\beta,\beta$-dichlorovinyl) phosphoric acid] with O,O-dimethyl-O-($\beta,\beta$-dichlorovinyl) phosphate.

6. Complex calcium salt of bis-[O-(p-chlorophenyl)-O-($\beta,\beta$-dichlorovinyl) phosphoric acid] with O,O-dimethyl-O-($\beta,\beta$-dichlorovinyl) phosphate.

7. Complex barium salt of bis-[O-(p-chlorophenyl)-O-($\beta,\beta$-dichlorovinyl) phosphoric acid] with O,O-di-n-butyl-O-($\beta,\beta$-dichlorovinyl) phosphate.

8. Complex calcium salt of bis-[O-methyl-O-(α-chloro-β,β,β-trichloroethyl) phosphoric acid] with O,O-dimethyl-O-(β,β-dichlorovinyl) phosphate.

9. Complex calcium salt of bis[O-methyl-O(α-chloro-β,β,β-trichloroethyl) phosphoric acid] with O,O-diethyl-O-(β,β-dichlorovinyl) phosphate 10. Complex calcium salt of bis-[O-methyl-O-(β-chloroethyl) phosphoric acid] with O,O-dimethyl-O-(β,β-dichlorovinyl) phosphate.

11. Complex calcium salt of bis-[O-n-butyl-O-(β-chlorovinyl) phosphoric acid] with O,O-diethyl-O-(β,β-dichlorovinyl) phosphate.

12. Complex calcium salt of bis-[O-di-(p-chlorophenyl) phosphoric acid] with O,O-dimethyl-O-(β,β-dichlorovinyl) phosphate.

No references cited.

CHARLES B. PARKER, *Primary Examiner*.

A. H. SUTTO, *Assistant Examiner*.